Nov. 1, 1955        A. R. SOFFEL        2,722,122
MEANS FOR REJECTING SPURIOUS FLOWMETER SIGNALS
Filed May 16, 1952
FIG. 1.
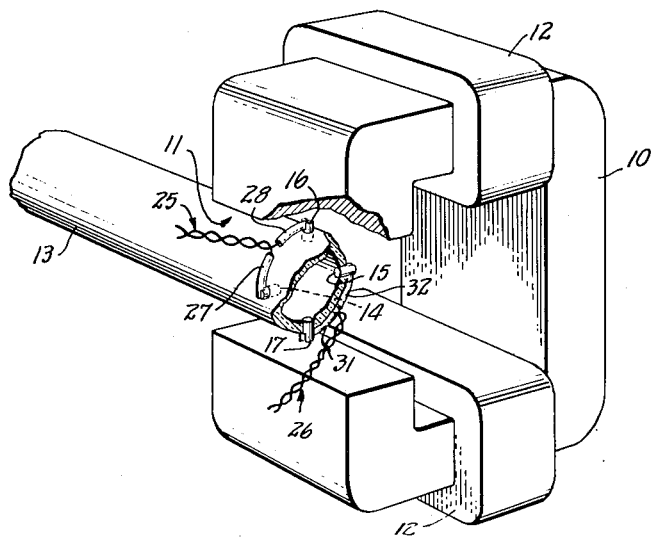
FIG. 2.
FIG. 3.
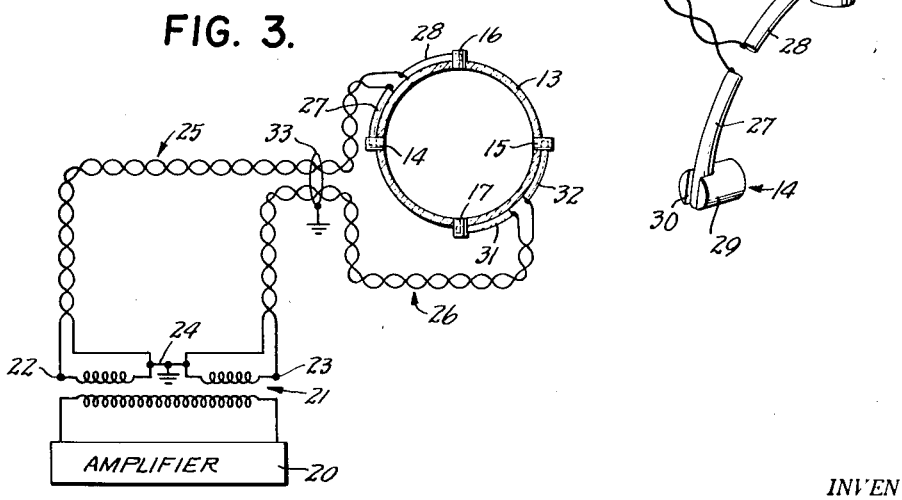
INVENTOR.
ARTHUR R. SOFFEL
BY
Mitchell & Bechert
ATTORNEYS

2,722,122

MEANS FOR REJECTING SPURIOUS FLOWMETER SIGNALS

Arthur R. Soffel, Ridgewood, N. J., assignor to Vitro Corporation of America, New York, N. Y., a corporation of Delaware Application May 16, 1952, Serial No. 288,128

10 Claims. (Cl. 73—194)

My invention relates to magnetic-induction flowmeters of the type in which flow is measured by observing the voltage induced across the flow passage in the presence of a magnetic field.

It is an object of the invention to provide an improved construction of the character indicated.

It is another object to provide improved means for reducing spurious signals which could otherwise mask the flow signal in a device of the character indicated.

It is a specific object to provide a flow-tube construction which need not be critical in its requirement for angular orientation of the electrodes with respect to the magnetic field in the gap.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Fig. 1 is a view in perspective of detecting elements in a magnetic-induction flowmeter, certain parts being broken away and the flow tube being shown in partial section at the probing section;

Fig. 2 is an enlarged fragmentary perspective view of electrode-lead connections in the device of Fig. 1; and Fig. 3 is an electrical diagram schematically indicating signal-processing means and electrical connections of the device of Fig. 1 thereto.

Briefly stated, my invention contemplates a novel employment of a flow tube having two pairs of opposed electrodes spaced from each other at the probing section. One pair of electrodes is oriented (predominantly, although not critically) so as substantially to cut the flux lines in the magnetic gap, and the other pair of electrodes is oriented (predominantly, although not critically) in substantial alignment with the flux lines across the gap. By means of novel electrical connections to the electrodes, spurious signals picked up by the electrodes may be effectively neutralized or reduced to insubstantial proportions, and a maximum flow signal may be obtained.

Referring to the drawings, my invention is shown in application to a flowmeter comprising magnetic means including a core 10, with a gap 11 on one side thereof. Balanced excitation windings 12 may be linked to symmetrical parts of the core 10 and connected electrically in series with each other and across an A.-C. excitation source (not shown). A flow tube 13 may substantially fill the gap 11 and include opposed electrodes 14—15 oriented substantially transverse to the flux lines in the gap 11.

In accordance with the invention, another pair of opposed electrodes 16—17 is provided in the flow tube 13 at the probing section, and the electrodes 16—17 are preferably equally angularly spaced from the electrodes 14—15 and, therefore, at right angles thereto. All electrodes 14—15—16—17 are preferably flush with the inner wall of the flow tube 13, and should be insulated from each other. In the form shown, the tube 13 is of an insulating material, such as glass or plastic, and the electrodes may be simply fused in the positions indicated. It will be clear that, when the probing electrodes 14—15 are aligned substantially transverse to the flux lines in the gap 11, the other electrodes 16—17 are in substantial alignment with the flux lines across the gap.

Flow-induced signals may be brought to signal-processing means, such as an amplifier 20, through coupling means, such as a transformer 21. For coupling to the electrodes, transformer 21 presents two connection points 22—23 at the outer ends, and a third connection means 24 at a neutral point, which may be a central tap on the primary winding of the transformer. One pair of adjacent electrodes, say the adjacent electrodes 14—16, may be connected across one half of the primary of transformer 21, as between the connection points 22—24, and the other two adjacent electrodes 15—17 may be connected to the connection points 23—24. For each of these connections, I prefer to employ a twisted pair, designated generally 25—26, respectively; twisting is desirable to the closest proximity to the respective adjacent electrode pairs (14—16 or 15—17, as the case may be).

At the probing section, I have shown the points of connection of the twisted pairs to be symmetrically spaced about the probing section and with respect to the particular adjacent electrodes to which the connections are made in each case. To minimize the inducement of spurious signals due to placement of electrode leads out of the plane of the probing section before the leads are twisted with each other, I provide separate short leads, which may be integrally formed with the respective electrodes and bent in the desired direction, always preferably in the plane of the probing section; however, in the form shown, I have illustrated separate lead members, as at 27—28, for the electrodes 14—16. Each of the leads 27—28 may be relatively rigid and arcuately bent to lie on the surface of the flow tube at the probing section. I have shown electrodes, such as electrode 14 in Fig. 2, to be provided with a short outwardly projecting portion 29, extending externally of the flow tube and grooved, as at 30, to receive the lead 27 and to provide a good base for soldering the same in place. These lead connections 27—28 may extend symmetrically toward each other in the plane of the probing section, to a point where the twisted pair 25 may be symmetrically connected, as will be understood. The other twisted pair 26 may be connected to leads 31—32, in a manner analogous to that described for the leads 27—28; and both twisted pairs 25—26 are preferably brought out of the gap on the same side (as to the left, in the sense of the drawings). If desired, grounded shield means (schematically designated at 33) may be provided for the twisted pairs 25—26, at a point of closest convenient proximity to the flow tube.

The described arrangement provides two loops 14—16—22—24 and 15—17—23—24 arranged to generate unwanted signals of opposite phase. These signals tend to cancel out, as applied to the primary of transformer 21, whereas the useful flow signal is applied additively to the two halves of the primary of transformer 21, so that substantially only the desired flow signal is passed to the amplifier means 20. The described configuration of electrodes, and their connection to the transformer, may be viewed as a means for compensating for initial misalignment of the flow tube with respect to the magnetic field. My arrangement is thus not highly critical in its requirement for angular orientation of the electrodes with respect to the magnetic field in the gap.

While I have described my invention in detail for the preferred form shown, it will be understood that modifications may be made within the scope of the invention, as defined in the claims which follow.

I claim:
1. In a flowmeter, a magnet including a core with a gap therein, a flow tube with two pairs of opposed electrodes spaced about a probing section oriented in said gap, one opposed pair of electrodes being predominantly oriented in alignment with flux lines in said gap, and the other opposed pair being predominantly oriented transverse to flux lines in said gap, balanced output coupling means including two outer signal connections and a central neutral connection, whereby two balanced sides of said coupling means are defined, means electrically coupling two adjacent electrodes across one side of said coupling means, and means electrically coupling the other two electrodes across the other side of said coupling means, the electrodes of said one pair being connected to said neutral connection and the electrodes of said other pair being connected to said outer connections.

2. In a flowmeter, a magnet including a core with a gap therein, a flow tube with two pairs of opposed electrodes spaced at right angles to each other about the probing section and oriented in said gap, one pair of electrodes being substantially aligned with the flux lines across said gap and the other pair of electrodes being substantially transverse to the flux lines in said gap, output transformer means having an input winding including end connections and a center connection; means electrically coupling said second pair of opposed electrodes across said end connections, and means electrically connecting said first-mentioned pair of opposed electrodes together at said center connection.

3. A flowmeter according to claim 2, in which said connections include a first twisted pair for the first two adjacent electrodes, and a second twisted pair for the opposite two adjacent electrodes.

4. In a flowmeter, a magnet including a core with a gap therein, a flow tube with two pairs of opposed electrodes spaced uniformly about a probing section and oriented in said gap, one pair of electrodes being aligned substantially transverse to the predominant lines of flux across said gap, and the other pair of opposed electrodes being in substantial alignment with the predominant lines of flux across said gap, output connections to said electrodes including a first twisted pair connected to a first two adjacent electrodes and a second twisted pair connected to the other two adjacent electrodes, and balanced output coupling means including two outer signal connections and a center connection, the connections of said twisted pairs to said coupling means being such that the electrodes of said first pair are connected to said outer connections and the electrodes of said other pair are connected to said center connection.

5. A flow tube according to claim 4, in which connections of said twisted pairs to the respective pairs of adjacent electrodes are made symmetrically about the probing section.

6. A flow tube according to claim 4, in which connections of the first twisted pair to the first pair of adjacent electrodes are symmetrical with respect to said first pair of adjacent electrodes, and in which connections of the second twisted pair to the second pair of adjacent electrodes are symmetrical with respect to said second pair of adjacent electrodes.

7. A flowmeter according to claim 4, in which the electrode connections include a first pair of leads extending in the plane of the probing section toward each other from the first pair of adjacent electrodes, said first-twisted pair being connected to the adjacent ends of said leads, and a second pair of leads connected to the remaining electrodes and extending toward each other in the plane of the probing section, said second twisted pair being connected to the adjacent ends of said second pair of leads.

8. A flowmeter according to claim 4, in which both twisted pairs are brought out of said gap on the same side of said gap.

9. A flowmeter according to claim 4, and including shield means for said twisted pairs.

10. In a flowmeter, a magnet including a core with a gap therein, a flow tube with two pairs of opposed electrodes spaced about a probing section oriented in said gap, one opposed pair of electrodes being predominantly oriented in alignment with flux lines in said gap, and the other opposed pair being predominantly oriented transverse to flux lines in said gap, balanced output coupling means comprising two like impedances connected in series to define a center point at their interconnection and end points at the unconnected ends of said impedances, and means electrically connecting said one pair to said center point and said other pair to said end points.

References Cited in the file of this patent
UNITED STATES PATENTS
2,607,223   Fleming _____ Aug. 19, 1952

OTHER REFERENCES

The Measurement of Sea-Water Velocities by Electromagnetic Induction, Guelke et al., published in Journal of the Institution of Electrical Engineers, vol. 94, part II, pp. 71–74, 1947.

Improved Apparatus and Technique for Electromagnetic Determination of Blood Flow, A. Kolin, published in Review of Scientific Instruments, vol. 23, No. 5, May 1952, pp. 235–241.